US007054291B2

(12) United States Patent

Balazinski et al.

(10) Patent No.: US 7,054,291 B2

(45) Date of Patent: May 30, 2006

(54) METHOD OF AND SYSTEM FOR MOBILE STATION ABBREVIATED POINT-TO-POINT PROTOCOL NEGOTIATION

(75) Inventors: Bartosz Balazinski, Montreal (CA); Jean-François Bertrand, Montreal (CA); Eric Dyke, L'lle Perrot (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 832 days.

(21) Appl. No.: 09/767,362

(22) Filed: Jan. 22, 2001

(65) Prior Publication Data

US 2002/0097707 A1 Jul. 25, 2002

(51) Int. Cl.
*H04Q 7/00* (2006.01)

(52) U.S. Cl. ...................................... 370/331; 370/338

(58) Field of Classification Search ........ 370/230–231, 370/335, 338, 342, 352–356, 392, 401
See application file for complete search history.

(56) References Cited

U.S. PATENT DOCUMENTS

| | | | | |
|---|---|---|---|---|
| 6,628,671 | B1 * | 9/2003 | Dynarski et al. | 370/469 |
| 6,651,090 | B1 * | 11/2003 | Itabashi et al. | 709/217 |
| 2002/0006132 | A1 * | 1/2002 | Chuah et al. | 370/401 |
| 2002/0068570 | A1 * | 6/2002 | Abrol et al. | 455/438 |

FOREIGN PATENT DOCUMENTS

| | | |
|---|---|---|
| WO | WO 00/44133 | 7/2000 |

OTHER PUBLICATIONS

M.C. Chuah et al., Mobile PPP (MPPP), Internet Draft, PPP-Extension Working Group, XP-002134063, Nov. 18, 1999.

Simpson, Point-to-Point Protocol, RFC 1661, XP-002141548, Jul. 1994.

PCT Search Report of Oct. 4, 2002 received in corresponding PCT application PCT/CA02/00046.

* cited by examiner

*Primary Examiner*—Ricky Q. Ngo
*Assistant Examiner*—Rhonda Murphy
(74) *Attorney, Agent, or Firm*—Jenkens & Gilchrist, P.C.

(57) ABSTRACT

An abbreviated point-to-point protocol (PPP) negotiation in a wireless communication system is performed between a first peer, such as a mobile station, and a second peer, such as a packet data service node. The first peer sends a link control protocol option designated option X to the second peer. The option X identifies a user profile that includes at least one pre-negotiated point-to-point protocol parameter. If the second peer supports the user profile and the at least one parameter is acceptable to the second peer, the second peer acknowledges that the user profile is acceptable to the second peer. In response, the first peer acknowledges that the user profile is acceptable to the first peer. In response to both peers acknowledging that the user profile is acceptable, each of the peers sets a respective state machine in accordance with the user profile. If the second peer supports the user profile but one or more of the at least one parameter of the user profile is not acceptable to the second peer, the second peer sends a negative-acknowledgment to the first peer that identifies a second user profile that is acceptable to the second peer. If the second peer does not support the user profile, the second peer rejects the first user profile and a full point-to-point-protocol negotiation is performed without reference to any of the pre-stored user profiles.

27 Claims, 3 Drawing Sheets

METHOD OF AND SYSTEM FOR MOBILE STATION ABBREVIATED POINT-TO-POINT PROTOCOL NEGOTIATION

TECHNICAL FIELD OF THE INVENTION

The present invention relates to wireless communications systems in general and, in particular, to abbreviated negotiation of mobile station point-to-point protocol parameters using a link control protocol option.

BACKGROUND

Advancements in the fields of electronics and communications have permitted the introduction and commercialization of many new types of communication systems. Information can be affordably communicated to locations in manners previously not possible or affordable.

The field of cellular telephony is exemplary of a communication system that has been made possible due to such advancements. Communication using a cellular telephone or other radiotelephonic system is advantageous because a fixed, wireline connection is not required between a sending station and receiving station to permit communications to be effectuated therebetween. A cellular or other radiotelephonic communication system is therefore particularly advantageous to effectuate communications when the use of fixed or hard-wired connections would be inconvenient or impractical. Continued advancements in the field of cellular telephony, as well as other types of radiotelephonic communications, have permitted the introduction of new services and new forms of communication pursuant to already-installed cellular, and other radiotelephonic, networks.

Proposals have been set forth to provide existing cellular, and other communication networks, with the capability of communicating packet data. Information to be transmitted between a sending station and a receiving station is formed into discrete packets of data. Individual packets can be sent on a communication channel from the sending station to the receiving station. Because the information is communicated by way of discrete packets, the sending station need utilize the channel only during the time periods required to send the discrete packets. A channel is typically, therefore, a shared channel used by a plurality of sending stations.

To communicate a packet of data to a mobile station (MS), the packet must be addressed with an identification address of the mobile station. An Internet Protocol (IP) address is exemplary of an identification address that can be used to address packets of data that are to be relayed to the mobile station. The IP address is, of course, utilized when transmissions are made pursuant to an Internet Protocol. Many different types of services have been implemented that are effectuated by the communication of packet data according to various other protocols.

Transmission Control Protocol/Internet Protocol (TCP/IP) is the protocol of the Internet and has become the global standard for communications. TCP provides transport functions that insure that the total amount of bytes sent is received correctly, while IP provides a routing mechanism. TCP/IP is a routeable protocol, which means that messages contain not only the address of a destination station, but also the address of a destination network. Every user in a TCP/IP network requires an IP address. In Simple IP, which is used by non-mobile Internet users, a new IP address is dynamically assigned every time a user negotiates a point-to-point protocol session.

Point-to-point Protocol (PPP) is a protocol that provides point-to-point access and enables networking over serial lines. The cdma2000 wireless communication standard is a third generation technology that increases data transmission rates in CDMA (code division multiple access) systems. Point-to-point protocol is the protocol used by the cdma2000 wireless communication standard for communications between, for example, mobile stations and packet data service nodes (PDSNs). A packet data transfer session using point-to-point protocol between a mobile station and a packet data service node is referred to as a point-to-point protocol session.

In order for a mobile station to gain access to the Internet, an air interface between the mobile station and a radio network (RN) and a connection between the radio network and the packet data service node over an radio-network-packet-data-service-node (R-P) interface must be established. When the mobile station is involved in a point-to-point protocol session using the air interface and the R-P interface, the connection is collectively referred to as a point-to-point protocol (PPP) connection.

Point-to-point protocol comprises several sub-protocols, including the link control protocol (LCP) and several network control protocols. Which of the sub-protocols other than link control protocol is used depends on the type of traffic that is to be sent over the point-to-point protocol connection. Link control protocol, which is used for link establishment, configuration, and testing, is the only one of the sub-protocols of point-to-point protocol that is employed every time a point-to-point protocol session is negotiated.

The term "full point-to-point protocol negotiation" refers to a point-to-point protocol negotiation that includes negotiation of the link control protocol and potentially includes negotiation of one or more of the other sub-protocols that comprise the point-to-point protocol. In a full point-to-point protocol negotiation, link control protocol negotiation must reach a certain stage before the other sub-protocols comprising point-to-point protocol can be negotiated. Furthermore, the full point-to-point protocol negotiation must be performed every time the mobile station initiates a point-to-point protocol session, including when the mobile station is involved in a handover between packet data service nodes.

When link control protocol options are negotiated, a first peer (e.g., a mobile station) sends to a second peer (e.g., a PDSN) a request (REQ) message that includes an option number that identifies a particular link control protocol option. The link control protocol option includes certain parameters (typically referred to as options), such as, for example, maximum transmit unit and authentication method, that the first peer requests to use during that particular point-to-point protocol session. Either of the peers can send the REQ message. Next, the second peer examines the option and the parameters and, if the parameters are satisfactory to the second peer, the second peer replies to the first peer with an acknowledge (ACK) message, which indicates to the first peer that the option and parameters have been accepted by the second peer.

If the option is not supported by the second peer, the second peer sends a rejection (REJ) message to the first peer. If the second peer supports the option but one or more of the parameters is not acceptable to the second peer, the second peer sends a negative acknowledge (NAK) message to the first peer that identifies a second set of parameters that are acceptable to the second peer. If the second set of parameters is acceptable to the first peer, the first peer replies to the second peer with an ACK message.

When the mobile station is engaged in a point-to-point protocol session, the mobile station will often need to be handed over between different cells of the wireless communication system as the mobile station roams. Sometimes these handovers of the mobile station require that handling of the point-to-point protocol session be transferred from a first packet data service node to a second packet data service node. Such inter-packet-data-service-node handovers typically occur when, following the handover, the radio network serving the mobile station cannot connect to the first packet data service node such as, for example, when the radio network is not aware of the first packet data service node, when the radio network belongs to an operator that does not wish to use the first packet data service node, or when the network topology does not allow the radio network to reach the first packet data service node.

In connection with the inter-packet-data-service-node handover, the point-to-point protocol session begun prior to the handover must be fully negotiated again even though most often the point-to-point protocol parameters (e.g., PPP options) are limited to only a few choices and seldom change. The point-to-point protocol parameters very frequently have the same characteristics when the mobile station is served by the first packet data service node as when the mobile station is served by the second packet data service node.

Since the point-to-point protocol negotiation parameters of mobile stations seldom change, full point-to-point protocol negotiation is often unnecessary and constitutes a significant waste of time and system resources. This is especially true when a poorly-performing air interface between the mobile station and the radio network causes data packets to be lost during the full point-to-point protocol negotiation, resulting in numerous packet retransmissions. Delays due to these data packet retransmissions may be long enough to cause failures in real-time applications that are running on the mobile station, especially during inter-packet-data-service-node handovers.

There is accordingly a need for a method and system for faster and more reliable mobile station point-to-point protocol negotiation upon the mobile station beginning a new point-to-point protocol session or being handed over between packet data service nodes.

SUMMARY OF THE INVENTION

A method of performing an abbreviated point-to-point protocol (PPP) negotiation comprising the step of pre-storing a first user profile in a first database of a first peer and in a second database of a second peer. The first pre-stored user profile includes at least one pre-negotiated PPP parameter. The first peer sends an option identifying the first pre-stored user profile to the second peer. The first peer and the second peer each retrieve the first pre-stored user profile in response to agreement by the peers on the first pre-stored user profile and set their state machine in accordance with the first pre-stored user profile.

A wireless communication system for providing packet data services between a first peer and a second peer comprises a first peer engaging in negotiation of a point-to-point protocol (PPP) session and having a first database storing a first user profile that includes at least one pre-negotiated PPP parameter. The first user profile stored in the first database is linked to an option. The system includes a second peer engaging in the negotiation with the first peer and having a second database storing the first user profile. The first user profile stored in the second database is linked to the option. The first peer sends the option to the second peer and, if the peers agree on the first user profile, the first user profile is retrieved from the first database and the second database and a state machine of the first peer and a state machine of the second peer are set in accordance with the first user profile.

BRIEF DESCRIPTION OF THE DRAWINGS

A more complete understanding of the method and system of the present invention may be acquired by reference to the following Detailed Description when taken in conjunction with the accompanying Drawings wherein.

DETAILED DESCRIPTION OF THE DRAWINGS

Figure 1:
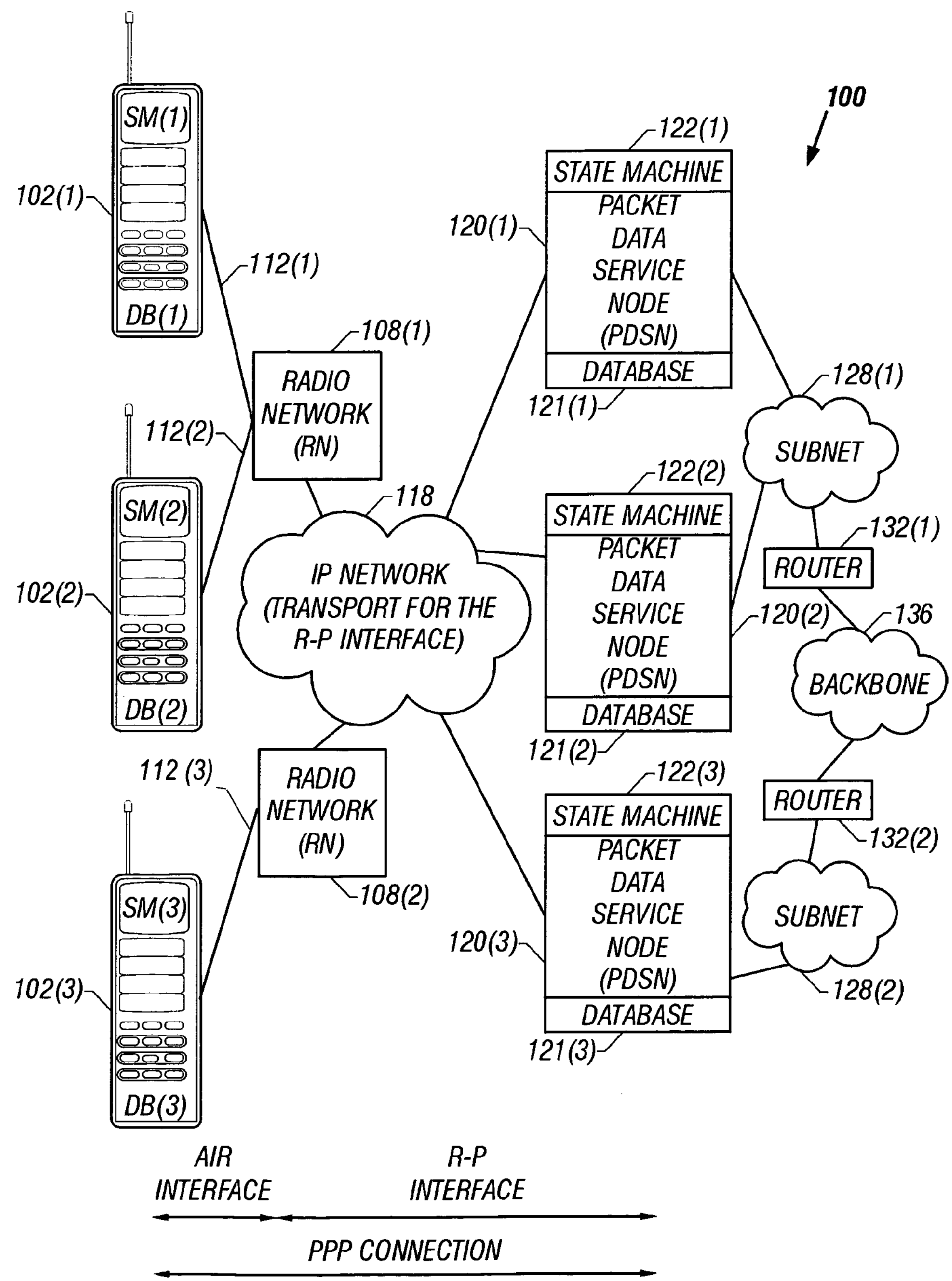
FIG. 1 is a block diagram illustrating an exemplary wireless communication system in accordance with the present invention.

Reference is now made to FIG. 1, wherein there is shown a block diagram illustrating an exemplary wireless communication system 100 in accordance with the present invention. Mobile stations (MSs) 102(1), 102(2) and 102(3) are shown connected to radio networks (RNs) 108(1) and 108(2), wherein the mobile stations 102(1) and 102(2) are connected to the radio network 108(1) and the mobile station 102(3) is connected to the radio network 108(2). Each of the mobile stations 102(1), 102(2) and 102(3) is connected to its respective radio network 108(1) or 108(2) via an air interface. The mobile station 102(1) and the mobile station 102(2) are shown connected to the radio network 108(1) via air interfaces 112(1) and 112(2), respectively. Similarly, the mobile station 102(3) is connected, via an air interface 112(3), to the radio network 108(2). Each of the mobile stations 102(1), 102(2) and 102(3) has a database (DB) that can be used to store data, such as, for example, pre-stored user profiles to be used during point-to-point protocol (PPP) negotiations. The mobile station 102(1) has a database DB(1), while the mobile station 102(2) has a database DB(2) and the mobile station 102(3) has a database DB(3). Each of the mobile stations 102(1), 102(2) and 102(3) also has a PPP state machine (SM) that can be used to store the status of, for example, PPP parameters (e.g., PPP options) used during PPP negotiations. The mobile station 102(1) has a PPP state machine SM(1), while the mobile station 102(2) has a PPP state machine SM(2) and the mobile station 102(3) has a PPP state machine SM(3).

The radio networks 108(1) and 108(2) are shown connected to an Internet Protocol (IP) network 118, the IP network 118 serving as an interface between the radio networks 108(1) and 108(2) and a plurality of Packet Data Service Nodes (PDSNs) 120(1), 120(2) and 120(3). The packet data service node 120(1) includes a database 121(1), while the packet data service node 120(2) includes a database 121(2) and the packet data service node 120(3) includes a database 121(3). Each of the databases 121(1), 121(2) and 121(3) can be used to store data, such as, for example, pre-stored user profiles to be used during PPP negotiations. The packet data service node 120(1) includes at least one PPP state machine 122(1), while the packet data service node 120(2) includes at least one PPP state machine 122(2) and the packet data service node 120(3) includes at least one PPP state machine 122(3). Each of the packet data service nodes 120(1), 120(2), and 120(3) includes one PPP state machine per PPP connection; therefore, for example, if the packet data service node 120(1) were serving five mobile stations 102, five PPP state machines 122 would be present to execute PPP negotiations between the packet data service node 120(1) and the five mobile stations 102. Each of the PPP state machines 122(1), 122(2) and 122(3) can be used, for example, to store the status of PPP parameters used during PPP negotiations.

The interface provided by the IP network 118 between the radio networks 108(1) and 108(2) and the packet data service nodes 120(1), 120(2) and 120(3), is referred to as the R-P interface. When a mobile station is involved in a point-to-point protocol session using both the air interface and the R-P interface, this connection is collectively referred to as a point-to-point protocol (PPP) connection.

Also shown connected to the Packet Data Service Nodes 120(1), 120(2), and 120(3) are subnets 128(1) and 128(2). Connected to the subnets 128(1) and 128(2) are routers 132(1) and 132(2), which are in turn connected to a backbone 136. The packet data service nodes 120(1), 120(2) and 120(3) are responsible for establishing, maintaining, and terminating point-to-point protocol sessions with mobile stations such as the mobile stations 102(1), 102(2) and 102(3). The radio networks 108(1) and 108(2) are responsible for relaying the point-to-point protocol session data between the mobile stations 102(1), 102(2) and 102(3) and the packet data service nodes 120(1), 120(2) and 120(3). Under the prior art, each time a new point-to-point protocol session is begun by one of the mobile stations 102(1), 102(2), or 102(3), a full point-to-point protocol negotiation, including a link control protocol (LCP) negotiation, must be performed.

If a mobile station such as the mobile station 102(1) desires to begin a point-to-point protocol session, it will communicate with the radio network 108(1) via the air interface 112(1). The radio network 108(1) will then select a packet data service node using the IP network 118. For purposes of this example, it is assumed that the radio network 108(1) has selected, via the IP network 118, the packet data service node 120(1) to handle the point-to-point protocol session of the mobile station 102(1). Under the prior art, a first full point-to-point protocol negotiation must take place for the point-to-point protocol session involving the mobile station 102(1) to take place.

Because the mobile stations 102(1), 102(2) and 102(3) are able to roam, they can move, for example, from a service area served by the radio network 108(1) to another service area served by the radio network 108(2). If roaming occurs while a mobile station is involved in a point-to-point protocol session, the radio network to which a mobile station has been handed over typically tries to avoid an inter-packet-data-service-node handover, which is a handover that requires service from a different packet data service node to handle the point-to-point protocol session than the packet data service node providing service just prior to the handover. However, it is possible that, following the handover process, the mobile station may be served by a radio network that, for any of a number of reasons, cannot reach the packet data service node that was previously handling the point-to-point protocol session of the mobile station immediately prior to the handover. Under the prior art, in this inter-packet-data-service-node handover situation, a full point-to-point protocol negotiation, including a link control protocol (LCP) negotiation, is required to continue the point-to-point protocol session.

Figure 2:
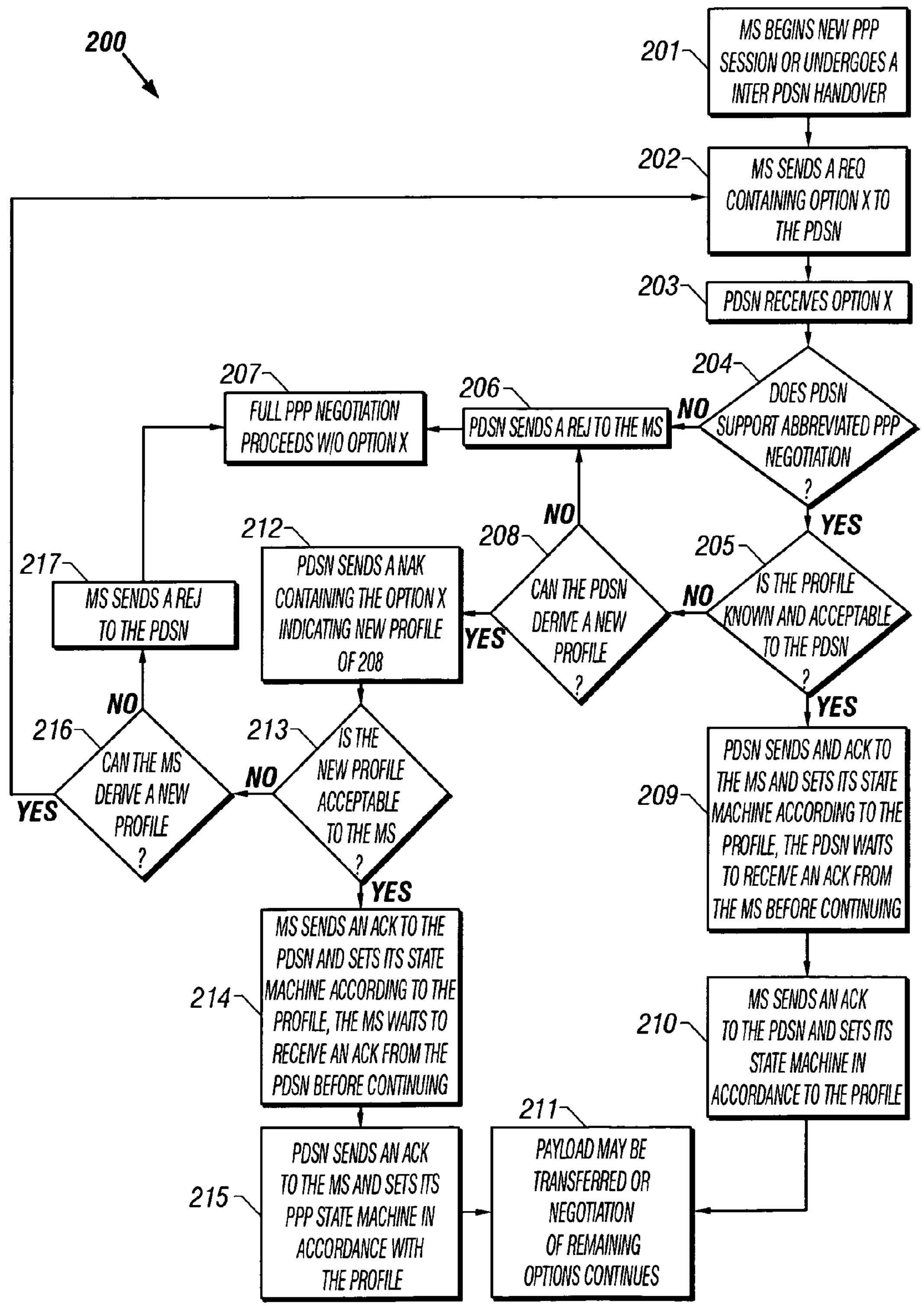
FIG. 2 is a flow chart illustrating an abbreviated point-to-point protocol negotiation algorithm in accordance with an embodiment of the present invention. To facilitate understanding, identical reference numerals have been used in the drawings, where possible, to designate identical elements.

Reference is now made to FIG. 2, wherein there is shown a flow chart illustrating operation of an abbreviated point-to-point protocol negotiation algorithm in accordance with an embodiment of the present invention. The term "abbreviated point-to-point protocol negotiation" refers to a point-to-point protocol negotiation in which one or more of the point-to-point protocol parameters that would normally be negotiated in a full point-to-point protocol negotiation between a first peer and a second peer are pre-negotiated, stored in at least one database accessible to the peers, and accessed for use in streamlining the negotiation process. Advantageously, if all of the point-to-point protocol parameters of a full point-to-point protocol negotiation were pre-negotiated, there would be no need for point-to-point protocol negotiation of any of the pre-negotiated parameters.

The mobile station 102(1) is the first peer and the packet data service node 120(1) is the second peer, such that, for example, the mobile station 102(1) sends a link control protocol option designated option X to the packet data service node 120(1) at step 202 in a REQ message. The option X identifies a pre-stored user profile that includes one or more pre-negotiated point-to-point protocol parameters (e.g., PPP options) that the mobile station 102(1) and the packet data service node 120(1) could potentially agree on during a full point-to-point protocol negotiation, such as, for example, point-to-point protocol compression or user IP address. The specific user profile identified by the option X of the REQ message can be, for example, stored by the peers in the databases DB(1), DB(2), DB(3), 121(1), 121(2) and 121(3) on a per-mobile-station basis or on a global basis in which the same parameters are set for a given set of mobile stations. Since the mobile station 102(1) and the packet data service node 120(1) are peers, the mobile station 102(1) and the packet data service node 120(1) could be substituted for one another in the steps of the algorithm 200.

The abbreviated point-to-point protocol negotiation algorithm 200 begins at step 201, wherein the mobile station 102(1) begins a new point-to-point protocol session or undergoes an inter-packet-data-service-node handover while engaged in a point-to-point protocol session, either of which requires point-to-point protocol negotiation between the mobile station 102(1) and the packet data service node 120(1). From step 201, execution proceeds to step 202. At step 202, the mobile station 102(1) sends a REQ message containing the option X to the packet data service node 120(1) via the radio network 108(1). The option X identifies the pre-stored user profile.

The pre-stored user profile identified by the option X represents a suggested set of PPP-related parameters that the mobile station 102(1) requests be used during that particular point-to-point protocol session. The option X identifies the pre-stored user profile by a user profile ID that the packet data service node 120(1) can compare to a set of pre-stored user profiles indexed by user profile ID in the database 121(1). The referenced pre-stored user profile, along with the parameters included therein, can then be retrieved from the database 121(1) by the PDSN 120(1).

Referring again to FIG. 2, from step 202, execution proceeds to step 203. At step 203, the packet data service node 120(1) receives the option X of the REQ message. From step 203, execution proceeds to step 204. At step 204, a determination is made whether the packet data service node 120(1) supports abbreviated PPP negotiation. If the PDSN 120(1) supports abbreviated PPP negotiation, execution proceeds to step 205. At step 205, a determination is made whether the user profile identified by the Option X is known by and acceptable to the PDSN 120(1). The determination of step 205 is typically made by the packet data service node 120(1) determining whether the packet data service node 120(1) has a pre-stored user profile linked to the user profile ID of the option X in the database 121(1). If, at step 205, it is so determined, execution proceeds to step 209.

If, at step 204, it is determined that the packet data service node 120(1) does not support abbreviated PPP negotiation, execution proceeds to step 206. At step 206, the packet data service node 120(1) sends a rejection (REJ) message to the mobile station 102(1), which indicates to the mobile station 102(1) that the pre-stored user profile identified by the option X is not supported by the packet data service node 120(1). From step 206, execution proceeds to step 207. At step 207, a full point-to-point protocol negotiation as known from the prior art is performed without reference to the pre-stored user profile identified by the option X.

If it is determined at step 205 that the pre-stored user profile identified by the option X is not acceptable to the packet data service node 120(1), execution proceeds to step 208. At step 208, a determination is made whether the packet data service node 120(1) can derive another pre-stored user profile stored in the database 121(1) that is similar to the pre-stored user profile identified by the option X.

Criteria for the derivation of another user profile can be established as needed. For example, the pre-stored user profile identified by the option X could include all parameters necessary for a PPP negotiation, so that no further PPP negotiation would be necessary. Because the PPP parameters of the user profile identified by the option X are typically negotiated in a pre-determined sequence, sufficient similarity to permit derivation could be found between the pre-stored user profile identified by the option X and another user profile stored in the database 121(1) or the database DB(1), if, for example, the profiles were to match along only a portion of the negotiation. Thus, a pre-stored user profile that permits some but not all of the PPP parameters of the user profile identified by the option X to be pre-negotiated would be an example of a derived similar user profile.

If, at step 208, it is determined that the packet data service node does not have another pre-stored user profile stored in the database 121(1) that is similar to the pre-stored user profile identified by the option X, execution moves to step 206.

If, at step 208, it is determined that the packet data service node 120(1) can derive another pre-stored user profile stored in the database 121(1) that is similar to the pre-stored user profile identified by the option X, execution proceeds to step 212. At step 212, the packet data service node 120(1) sends a negative-acknowledge (NAK) message that contains the option X to the mobile station 102(1) that identifies the pre-stored user profile derived at step 208. The NAK message is used by the packet data service node 120(1) to inform the mobile station 102(1) that the packet data service node 120(1) supports the pre-stored user profile identified by the option X but that at least one of the parameters of the pre-stored user profile identified by the option X is not acceptable to the packet data service node 120(1). The pre-stored user profile identified at step 208 includes parameters that are acceptable to the packet data service node 120(1).

From step 212, execution proceeds to step 213. At step 213, a determination is made whether the pre-stored user profile last sent by the packet data service node 120(1) at step 212 (i.e., the last pre-stored user profile sent by the packet data service node 120(1) with a NAK message) is acceptable to the mobile station 102(1). If it is so determined at step 213, execution proceeds to step 214. At step 214, the mobile station 102(1) sends an ACK message to the packet data service node 120(1), sets its PPP state machine SM(1) in accordance with the last pre-stored user profile whose identification was sent at step 212, and waits to receive an ACK message before continuing any further PPP related tasks. The ACK message sent at step 214 from the mobile station 102(1) to the packet data service node 120(1) serves as confirmation by the mobile station 102(1) to the packet data service node 120(1) that the last pre-stored user profile sent at step 212 by the packet data service node 120(1) will be used in the remainder of the point-to-point protocol negotiation. The last pre-stored user profile sent at step 212 can include pre-negotiated parameters that eliminate a need to negotiate some or all of any remaining point-to-point protocol parameters beyond the link control protocol negotiation.

From step 214, execution proceeds to step 215. At step 215, the packet data service node 120(1) sends an ACK message to the mobile station 102(1) and sets its PPP state machine 122(1) in accordance with the profile agreed upon at step 213. The ACK message at step 215 from the packet data service node 120(1) to the mobile station 102(1) serves as confirmation by the packet data service node 120(1) to the mobile station 102(1) that the last pre-stored user profile sent at step 212 by the packet data service node 120(1) will be used in the remainder of the point-to-point protocol negotiation.

The ACK message of step 215 from the packet data service node 120(1) to the mobile station 102(1) is required in order to ensure that the packet data service node 120(1) and the mobile station 102(1) have achieved synchronization by virtue of both the mobile station 102(1) and the packet data service node 120(1) having set their respective PPP state machines in accordance with the same pre-stored user profile. The parameters of the pre-stored user profiles are negotiated the same as any other link control protocol option except that an additional ACK message (e.g., the ACK message of step 215) must be sent by a peer that has received an ACK message (e.g., the ACK message of step 214) for the point-to-point protocol negotiation to proceed. If the additional ACK message were not included, one of the peers could potentially proceed in the point-to-point protocol negotiation beyond the link control protocol negotiation using different point-to-point protocol parameters than the other peer. For example, if there were no ACK message of step 215 and the ACK message of step 214 were not properly received by the packet data service node 120(1), the mobile station 102(1) could assume that the packet data service node 120(1) had properly received the ACK message of step 214 and begin to send messages belonging to subsequent point-to-point protocol sub-protocols or transfer payload even though the packet data service node 120(1) might not have set its state machine in accordance with the last pre-stored user profile sent at step 212 by the packet data service node 120(1).

Referring again to FIG. 2, from step 215, execution proceeds to step 211. At step 211, payload may be transferred (or negotiation of remaining options not contained in the profile may continue) between the mobile station 102(1) and the packet data service node 120(1).

If, at step 213, it is determined that the last pre-stored user profile sent by the packet data service node 120(1) at step 212 is not acceptable to the mobile station 102(1), execution proceeds to step 216. The packet data service node 120(1) and the mobile station 102(1) can continue to loop through steps 208, 212, 213, and 216 until the mobile station 102(1) and the packet data service node 120(1) find a mutually-acceptable pre-stored user profile or there are no more pre-stored user profiles similar to the pre-stored user profile identified by the option X.

At step 216, a determination is made whether the mobile station 102(1) can derive a new pre-stored user profile that is similar to the profile identified by the option X. If it is so determined, execution proceeds to step 202. If the mobile station 102(1) is not able to derive a new pre-stored user profile that is similar to the user profile identified by the option X, execution proceeds to step 217. At step 217, the mobile station 102(1) sends a REJ message to the packet data service node 120(1). The REJ message indicates to the packet data service node 120(1) that the mobile station 102(1) does not accept the pre-stored user profile last sent at step 212. From step 217, execution proceeds to step 207.

If it is determined at step 205 that the parameters of the pre-stored user profile identified by the option X are acceptable to the packet data service node 120(1), execution proceeds to step 209. At step 209, the packet data service node 120(1) sends an acknowledge (ACK) message to the mobile station 102(1), sets its PPP state machine 122(1) in accordance with the pre-stored user profile identified by the option X, and waits to receive an ACK message from the mobile station 102(1) before continuing with any further PPP-related tasks. The ACK message sent at step 209 by the packet data service node 120(1) serves as an acknowledgment by the packet data service node 120(1) to the mobile station 102(1) that the pre-stored user profile identified by the option X will be used in the remainder of the point-to-point protocol negotiation. From step 209, execution proceeds to step 210. At step 210, the mobile station 102(1) responds to the packet data service node 120(1) by sending an ACK message to the packet data service node 120(1) and setting its PPP state machine 122(1) in accordance with the pre-stored user profile identified by the option X. The ACK message at step 210 from the mobile station 102(1) to the packet data service node 120(1) serves as confirmation by the mobile station 102(1) to the packet data service node 120(1) that the pre-stored user profile identified by the option X will be used in the remainder of the point-to-point protocol negotiation.

The ACK message of step 210 from the mobile station 102(1) to the packet data service node 120(1) is required in order to ensure that the mobile station 102(1) and the packet data service node 120(1) have achieved synchronization by virtue of both the mobile station 102(1) and the packet data service node 120(1) having set their respective state machines in accordance with the same pre-stored user profile. The parameters of the pre-stored user profiles are negotiated the same as any other link control protocol option except that an additional ACK message (e.g., the ACK message of step 210) must be sent by a peer that has received an ACK message (e.g., the ACK message of step 209) for the point-to-point protocol negotiation to proceed. If the additional ACK message were not included, one of the peers could potentially proceed in the point-to-point protocol negotiation beyond the link control protocol negotiation using different parameters than the other peer. For example, if there were no ACK message of step 210 and the ACK message of step 209 from the packet data service node 120(1) were not properly received by the mobile station 102(1), the packet data service node 120(1) could assume that the ACK message of step 209 had been properly received by the mobile station 102(1) and begin to send messages belonging to subsequent point-to-point protocol sub-protocols or transfer payload to the mobile station 102(1) even though the mobile station 102(1) might not have set its state machine in accordance with the pre-stored user profile identified by the option X.

From step 210, execution proceeds to step 211. At step 211, payload may be transferred (or the negotiation of remaining options not contained in the profile may continue) between the packet data service node 120(1) and the mobile station 102(1). Each of the packet data service node 120(1) and the mobile station 120(1) setting its respective state machines 122(1) and SM(1) at step 210 in accordance with the pre-stored user profile identified by the option X permits the pre-stored user profile identified by the option X to be used in the remainder of the point-to-point protocol negotiation. The pre-stored user profile identified by the option X can include pre-negotiated parameters that eliminate a need to negotiate some or all of any remaining point-to-point protocol parameters beyond the link control protocol negotiation. The setting of the state machine 122(1) of the packet data service node 120(1) and of the state machine SM(1) of the mobile station 102(1) in accordance with the pre-stored user profile identified by the option X can therefore potentially obviate a need for any further point-to-point protocol negotiation between the packet data service node 120(1) and the mobile station 102(1).

It can thus be seen from FIG. 2 that use of the option X during the link control protocol negotiation permits an abbreviated point-to-point protocol negotiation upon a mobile station initiating a new point-to-point protocol session or undergoing an inter-packet-data-service-node handover. The abbreviated point-to-point protocol negotiation avoids the need to perform a full point-to-point protocol negotiation and saves time and system resources. The packet data service node can send messages that identify additional pre-stored user profiles similar to the pre-stored user profile identified by the option X if the packet data service node supports the pre-stored user profile identified by the option X but one or more of the point-to-point protocol parameters of the pre-stored user profile identified by the option X is not acceptable to the mobile station. Following acknowledgment of a pre-stored user profile by both the packet data service node and the mobile station, each of the packet data service node and the mobile station sets its respective state machine in accordance with the pre-stored user profile so that the agreed-upon pre-stored user profile can be sued in the remainder of the point-to-point protocol negotiation.

Figure 3:
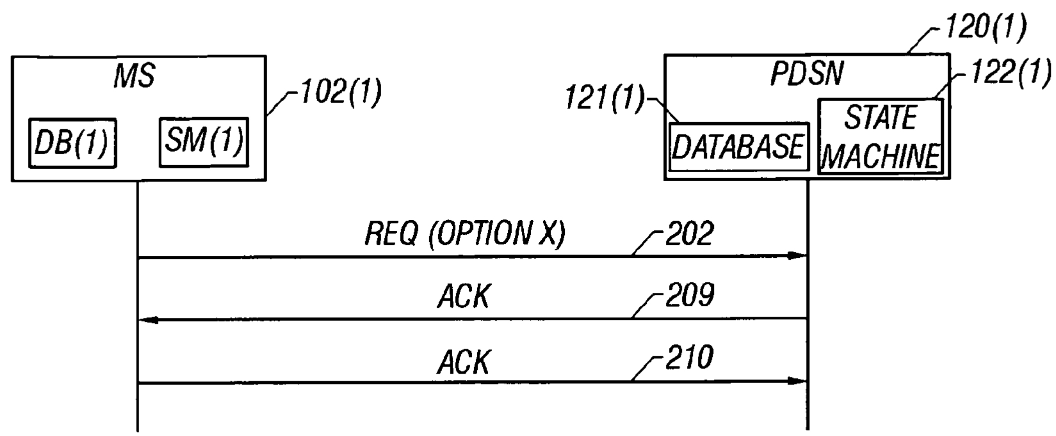
FIG. 3 is an exemplary messaging diagram illustrating messages flowing between a mobile station and a packet data service node engaged in an abbreviated point-to-point protocol negotiation in which a pre-stored user profile identified by a link control protocol option X is agreed upon by the mobile station and the packet data service node.

Reference is now made to FIG. 3, wherein there is shown an exemplary messaging diagram illustrating messages flowing between a mobile station and a packet data service node engaged in an abbreviated point-to-point protocol negotiation in which a pre-stored user profile identified by a link control protocol option X is agreed upon by the mobile station and the packet data service node. The mobile station 102(1) is the first peer and the packet data service node

120(1) is the second peer, such that the mobile station 102(1) sends a link control protocol option designated option X to the packet data service node 120(1) in the REQ message 202. The option X identifies a pre-stored user profile that includes one or more pre-negotiated point-to-point protocol parameters that the mobile station 102(1) and the packet data service node 120(1) could potentially agree on during a full point-to-point protocol negotiation, such as, for example, point-to-point protocol compression or user IP address. It is assumed in the messaging diagram of FIG. 3 that the mobile station 102(1) and the packet data service node 120(1) agree upon the pre-stored user profile identified by the option X and that the PPP negotiation proceeds therefrom.

In the example of FIG. 3, the specific user profile identified by the option X of the REQ message 202 has already been stored by the mobile station 102(1) in the database DB(1) and by the packet data service node 120(1) in the database 121(1). The REQ message 202 is sent by the mobile station 102(1) to the packet data service node 120(1) in response to either an inter-PDSN handover of the mobile station 102(1) or initiation of a new PPP session by the mobile station 102(1). Since the mobile station 102(1) and the packet data service node 120(1) are peers, the mobile station 102(1) and the packet data service node 120(1) could be substituted for one another in FIG. 3.

In response to the inter-PDSN handover or the initiation of the new PPP session, the mobile station 102(1) sends the REQ message 202, which includes the option X identifying the pre-stored user profile, to the packet data service node 120(1) via the radio network 108(1). In response to the REQ message 202, the PDSN 120(1) compares the pre-stored user profile identified by the option X to the set of pre-stored user profiles indexed by user profile ID in the database 121(1). The referenced pre-stored user profile, along with the parameters included therein, is then retrieved from the database 121(1) by the PDSN 120(1).

After retrieving the user profile identified by the option X, the packet data service node 120(1) determines that it supports the pre-stored user profile identified by the option X by determining that the packet data service node 120(1) has a pre-stored user profile linked to the user profile ID of the option X in the database 121(1). Next, the packet data service node determines that the parameters of the pre-stored user profile identified by the option X and retrieved from the database 121(1) are acceptable to the packet data service node 120(1).

Because the parameters of the pre-stored user profile identified by the option X are acceptable to the packet data service node 120(1), the packet data service node 120(1) sends an acknowledge (ACK) message 209 to the mobile station 102(1). The ACK message 209 sent by the packet data service node 120(1) to the mobile station 102(1) serves as an acknowledgment by the packet data service node 120(1) to the mobile station 102(1) that the pre-stored user profile identified by the option X will be used in the remainder of the point-to-point protocol negotiation.

The mobile station 102(1) responds to the ACK message 209 of the packet data service node 120(1) by sending an ACK message 210 to the packet data service node. The ACK message 210 from the mobile station 102(1) to the packet data service node 120(1) serves as confirmation by the mobile station 102(1) to the packet data service node 120(1) that the pre-stored user profile identified by the option X will be used in the remainder of the point-to-point protocol negotiation.

The ACK message 210 from the mobile station 102(1) to the packet data service node 120(1) is required in order to ensure that the mobile station 102(1) and the packet data service node 120(1) have achieved synchronization by virtue of both the mobile station 102(1) and the packet data service node 120(1) having set their respective state machines in accordance with the same pre-stored user profile. The parameters of the pre-stored user profiles are negotiated the same as any other link control protocol option except that an additional ACK message (e.g., the ACK message 210) must be sent by a peer that has received an ACK message (e.g., the ACK message 209) for the point-to-point protocol negotiation to proceed. If the additional ACK message were not included, one of the peers could potentially proceed in the point-to-point protocol negotiation beyond the link control protocol negotiation using different parameters than the other peer. For example, if there were no ACK message 210 and the ACK message 209 from the packet data service node 120(1) were not properly received by the mobile station 102(1), the packet data service node 120(1) could assume that the ACK message 209 had been properly received by the mobile station 102(1) and begin to send messages belonging to subsequent point-to-point protocol sub-protocols or transfer payload to the mobile station 102(1) even though the mobile station 102(1) might not have set its state machine in accordance with the pre-stored user profile identified by the option X.

Next, each of the packet data service node 120(1) and the mobile station 120(1) sets its respective state machines 122(1) and SM(1) in accordance with the pre-stored user profile identified by the option X so that the pre-stored user profile identified by the option X will be used in the remainder of the point-to-point protocol negotiation. The pre-stored user profile identified by the option X can include pre-negotiated parameters that eliminate a need to negotiate some or all of any remaining point-to-point protocol parameters beyond the link control protocol negotiation. The setting of the state machine 122(1) of the packet data service node 120(1) and of the state machine SM(1) of the mobile station 102(1) in accordance with the pre-stored user profile identified by the option X can therefore potentially obviate a need for any further point-to-point protocol negotiation between the packet data service node 120(1) and the mobile station 102(1).

It can thus be seen from FIG. 3 that use of the option X during the link control protocol negotiation permits an abbreviated point-to-point protocol negotiation upon a mobile station initiating a new point-to-point protocol session or undergoing an inter-packet-data-service-node handover. The abbreviated point-to-point protocol negotiation avoids the need to perform a full point-to-point protocol negotiation and saves time and system resources. Following acknowledgment of a pre-stored user profile by both the packet data service node and the mobile station, each of the packet data service node and the mobile station sets its respective state machine in accordance with the pre-stored user profile so that the agreed-upon pre-stored user profile can be used in the remainder of the point-to-point protocol negotiation.

Figure 4:
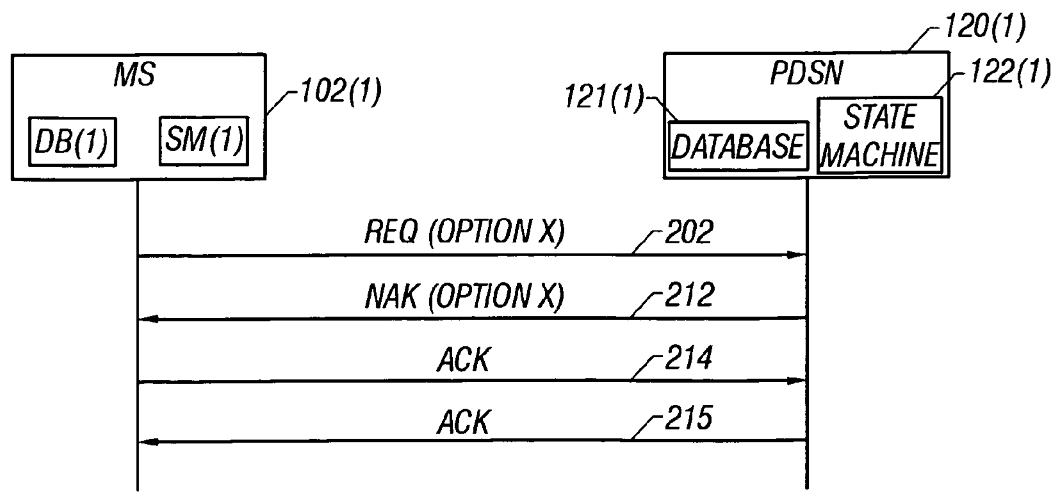
FIG. 4 is an exemplary messaging diagram illustrating messages flowing between a mobile station and a packet data service node engaged in an abbreviated point-to-point protocol negotiation in which a pre-stored user profile identified by a link control protocol option X is not acceptable to the packet data service node.

Reference is now made to FIG. 4, wherein there is shown an exemplary messaging diagram illustrating messages flowing between a mobile station and a packet data service node engaged in an abbreviated point-to-point protocol negotiation. In FIG. 4, a pre-stored user profile identified by a link control protocol option X is not acceptable to the packet data service node, so the packet data service node sends to the mobile station a NAK message identifying another pre-stored user profile that is similar to the pre-stored user profile identified by the option X.

The mobile station 102(1) is the first peer and the packet data service node 120(1) is the second peer, such that the mobile station 102(1) sends a link control protocol option designated option X to the packet data service node 120(1) in the REQ message 202. The option X identifies a pre-stored user profile that includes one or more pre-negotiated point-to-point protocol parameters that the mobile station 102(1) and the packet data service node 120(1) could potentially agree on during a full point-to-point protocol negotiation, such as, for example, point-to-point protocol compression or user IP address. It is assumed in the messaging diagram of FIG. 4 that the mobile station 102(1) and the packet data service node 120(1) do not agree upon the pre-stored user profile identified by the option X and that the packet data service node 120(1) sends a NAK message identifying another pre-stored user profile to the mobile station 102(1).

In the example of FIG. 4, the specific user profile identified by the option X of the REQ message 202 has already been stored by the mobile station 102(1) in the database DB(1) and by the packet data service node 120(1) in the database 121(1), but one or more of the parameters of the user profile identified by the option X is not acceptable to the packet data service node 120(1). The REQ message 202 is sent by the mobile station 102(1) to the packet data service node 120(1) in response to either an inter-PDSN handover of the mobile station 102(1) or initiation of a new PPP session by the mobile station 102(1). Since the mobile station 102(1) and the packet data service node 120(1) are peers, the mobile station 102(1) and the packet data service node 120(1) could be substituted for one another in FIG. 4.

In response to the inter-PDSN handover or the initiation of the new PPP session, the mobile station 102(1) sends the REQ message 202, which includes the option X identifying the pre-stored user profile, to the packet data service node 120(1) via the radio network 108(1). In response to the REQ message 202, the PDSN 120(1) compares the pre-stored user profile identified by the option X to the set of pre-stored user profiles indexed by user profile ID in the database 121(1). The referenced pre-stored user profile, along with the parameters included therein, is then retrieved from the database 121(1) by the PDSN 120(1).

After retrieving the user profile identified by the option X, the packet data service node 120(1) determines that it supports the pre-stored user profile identified by the option X by determining that the packet data service node 120(1) has a pre-stored user profile linked to the user profile ID of the option X in the database 121(1). Next, the packet data service node determines that one or more of the parameters of the pre-stored user profile identified by the option X and retrieved from the database 121(1) is not acceptable to the packet data service node 120(1).

In response to the determination by the packet data service node 120(1) that one or more of the parameters of the pre-stored user profile identified by the option X is not acceptable to the packet data service node 120(1), the packet data serves determines that it has another pre-stored user profile stored in the database 121(1) that is similar to the pre-stored user profile identified by the option X.

After it has determined that it has a similar pre-stored user profile, the packet data service node 120(1) sends a negative-acknowledge (NAK) message 212 to the mobile station 102(1) that identifies the similar pre-stored user profile. The NAK message 212 is used by the packet data service node 120(1) to inform the mobile station 102(1) that the packet data service node 120(1) supports the pre-stored user profile identified by the option X but that at least one of the parameters of the pre-stored user profile identified by the option X is not acceptable to the packet data service node 120(1). The similar pre-stored user profile includes parameters that are acceptable to the packet data service node 120(1). The NAK message includes an option that identifies the similar pre-stored user profile, which similar profile could be, for example, equivalent to the pre-stored user profile identified by the option X sent by the mobile station 102(1) except for an absence of certain unacceptable parameters.

In response to the NAK message 212, the mobile station 102(1) determines that the similar pre-stored user profile is acceptable to the mobile station 102(1) and sends the ACK message 214 to the packet data service node 120(1). The ACK message 214 from the mobile station 102(1) to the packet data service node 120(1) serves as confirmation by the mobile station 102(1) to the packet data service node 120(1) that the similar pre-stored user profile from the packet data service node 120(1) will be used in the remainder of the point-to-point protocol negotiation. The similar pre-stored user profile can include pre-negotiated parameters that eliminate a need to negotiate some or all of any remaining point-to-point protocol parameters beyond the link control protocol negotiation.

In response to the ACK message 214, the packet data service node 120(1) sends the ACK message 215 to the mobile station 102(1). The ACK message 215 from the packet data service node 120(1) to the mobile station 102(1) serves as confirmation by the packet data service node 120(1) to the mobile station 102(1) that the similar pre-stored user profile from the packet data service node 120(1) will be used in the remainder of the point-to-point protocol negotiation.

The ACK message 215 from the packet data service node 120(1) to the mobile station 102(1) is required in order to ensure that the packet data service node 120(1) and the mobile station 102(1) have achieved synchronization by virtue of both the mobile station 102(1) and the packet data service node 120(1) having set their respective state machines in accordance with the same pre-stored user profile. The parameters of the pre-stored user profiles are negotiated the same as any other link control protocol option except that an additional ACK message (e.g., the ACK message 215) must be sent by a peer that has received an ACK message (e.g., the ACK message 214) for the point-to-point protocol negotiation to proceed. If the additional ACK message 215 were not included, one of the peers could potentially proceed in the point-to-point protocol negotiation beyond the link control protocol negotiation using different point-to-point protocol parameters than the other peer. For example, if there were no ACK message 215 and the ACK message 214 were not properly received by the packet data service node 120(1), the mobile station 102(1) could assume that the packet data service node 120(1) had properly received the ACK message 214 and begin to send messages belonging to subsequent point-to-point protocol sub-protocols or transfer payload even though the packet data service node 120(1) might not have set its state machine in accordance with the similar pre-stored user profile sent from the packet data service node 120(1).

Referring again to FIG. 4, after the ACK message 215 has been sent, each of the packet data service node 120(1) and the mobile station 120(1) sets its respective state machine 122(1) and SM(1) in accordance with the similar pre-stored user profile sent from the packet data service node 120(1) so that the last pre-stored user profile will be used in the remainder of the point-to-point protocol negotiation. The setting of the state machine 122(1) of the packet data service node 120(1) and of the state machine SM(1) of the mobile station 102(1) in accordance with the similar pre-stored user profile sent by the packet data service node 120(1) can therefore potentially obviate a need for any further point-to-point protocol negotiation between the packet data service node 120(1) and the mobile station 102(1).

It can thus be seen from FIG. 4 that use of the option X during the link control protocol negotiation permits an abbreviated point-to-point protocol negotiation upon a mobile station initiating a new point-to-point protocol session or undergoing an inter-packet-data-service-node handover. The abbreviated point-to-point protocol negotiation avoids the need to perform a full point-to-point protocol negotiation and saves time and system resources. If the pre-stored user profile identified by the option X is not acceptable to the packet data service node, a similar pre-stored user profile can be sent by the packet data service node to the mobile station. Following acknowledgment of the similar pre-stored user profile by both the packet data service node and the mobile station, each of the packet data service node and the mobile station sets its respective state machine in accordance with the similar pre-stored user profile so that the agreed-upon similar pre-stored user profile can be used in the remainder of the point-to-point protocol negotiation.

Although preferred embodiments of the method and system of the present invention have been illustrated in the accompanying Drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. A method of performing an abbreviated point-to-point protocol (PPP) negotiation comprising the steps of:

pre-storing a first user profile in a first database of a mobile station (MS) and in a second database of a packet data service node (PDSN), the first pre-stored user profile representing a suggested set of PPP-related parameters and wherein the first user profile is stored prior to performing the abbreviated PPP negotiation;

initiating the abbreviated point-to-point protocol negotiation by sending an option identifying the first pre-stored user profile by the MS to the PDSN;

retrieving the first pre-stored user profile by the MS and the PDSN in response to agreement by the MS and the PDSN on the first pre-stored user profile;

setting of a state machine of the MS and a state machine of the PDSN in accordance with the first pre-stored user profile;

determining whether the PDSN supports the first pre-stored user profile;

rejecting by the PDSN of the first pre-stored user profile responsive to a determination that the PDSN does not support the first pre-stored user profile; and performing a full PPP negotiation in response to the rejection by the PDSN of the first pre-stored user profile.

2. The method of claim 1 wherein the step of sending the option identifying the first user profile is performed as part of a link control protocol negotiation.

3. The method of claim 1 wherein the step of sending the option identifying the second pre-stored user profile is performed as part of a link control protocol negotiation.

4. The method of claim 1 wherein the step of sending the option is performed in response to an inter-packet-data-service-node handover of one of the MS and the PDSN.

5. The method of claim 1 wherein the step of sending the option is performed in response to one of the MS and the PDSN initiating a new PPP session.

6. The method of claim 1 wherein the step of setting of the state machine of the MS and of the state machine of the PDSN in accordance with the first pre-stored user profile obviates a need for any further point-to-point protocol negotiation between the MS and the PDSN.

7. The method of claim 1 wherein the agreement by the MS and the PDSN on the first pre-stored user profile comprises each of the MS and the PDSN acknowledging that the first pre-stored user profile is acceptable.

8. The method of claim 1, wherein the step of determining whether the PDSN supports the first pre-stored user profile comprises the steps of:

determining whether each of the at least one parameter of the first pre-stored user profile is acceptable to the PDSN responsive to a determination that the PDSN supports the first pre-stored user profile; and responsive to a determination that each of the at least one parameter of the first pre-stored user profile is acceptable to the PDSN, the MS and the PDSN agreeing on the first pre-stored user profile.

9. The method of claim 8 wherein the step of setting of the state machine of the MS and of the state machine of the PDSN in accordance with the second pre-stored user profile obviates a need for any further point-to-point protocol negotiation between the MS and the PDSN.

10. The method of claim 8 further comprising the steps of:

determining whether the PDSN has a second pre-stored user profile similar to the first pre-stored user profile responsive to a determination that at least one of the at least one parameter of the first pre-stored user profile is not acceptable to the PDSN; and sending an option identifying the second pre-stored user profile by the PDSN to the MS responsive to a determination that the PDSN has the second pre-stored user profile.

11. The method of claim 10 further comprising the steps of:

rejecting by the PDSN of the second pre-stored user profile responsive to a determination that the PDSN does not have a third pre-stored user profile similar to the first pre-stored user profile; and performing a full point-to-point protocol negotiation in response to the rejection by the PDSN of the second pre-stored user profile.

12. The method of claim 10 wherein the step of sending the option identifying the second pre-stored user profile is performed as part of a link control protocol negotiation.

13. The method of claim 10 wherein the step of setting of the state machine of the MS and of the state machine of the PDSN in accordance with the second pre-stored user profile obviates a need for any further point-to-point protocol negotiation between the MS and the PDSN.

14. The method of claim 10 further comprising the steps of:

determining whether the second pre-stored user profile is acceptable to the MS;

retrieving the second pre-stored user profile by the MS and the PDSN in response to agreement by the MS and the PDSN on the second pre-stored user profile; and setting of the state machine of the MS and the state machine of the PDSN in accordance with the second pre-stored user profile.

15. The method of claim 14 wherein the agreement by the MS and the PDSN on the second pre-stored user profile comprises each of the MS and the PDSN acknowledging that the second pre-stored user profile is acceptable.

16. The method of claim 14 further comprising the steps of:

determining whether the PDSN has a third profile similar to the first pre-stored user profile responsive to a determination that the second pre-stored user profile is not acceptable to the MS;

sending an option identifying the third pre-stored user profile by the PDSN to the MS responsive to a determination that the PDSN has the third pre-stored user profile;

determining whether the third pre-stored user profile is acceptable to the MS;

retrieving the third pre-stored user profile by the MS and the PDSN in response to agreement by the MS and the PDSN on the third pre-stored user profile; and setting of a state machine of the MS and a state machine of the PDSN in accordance with the third pre-stored user profile.

17. The method of claim 16 wherein the agreement by the MS and the PDSN on the third pre-stored user profile comprises each of the MS and the PDSN acknowledging that the third pre-stored user profile is acceptable.

18. A wireless communication system for providing packet data services between a mobile station (MS) and a packet data service node (PDSN), the system comprising:

a MS engaging in negotiation of a point-to-point protocol (PPP) session and having a first database storing a first user profile that represents a suggested set of PPP-related parameters, the first user profile stored in the first database being linked to an option and wherein the first user profile is stored prior to engage the PPP session;

a PDSN engaging in the negotiation with the MS and having a second database storing the first user profile, the first user profile stored in the second database being linked to the option, wherein the MS sends the option to the PDSN and, if the MS and the PDSN agree on the first user profile, the first user profile is retrieved from the first database and the second database and a state machine of the MS and a state machine of the PDSN are set in accordance with the first user profile; and wherein the PDSN determines it whether it supports the first pre-stored user profile, rejects the first pre-stored user profile responsive to a determination that the PDSN does not support the first pre-stored user profile and performs a full PPP negotiation in response to the rejection by the PDSN of the first pre-stored user profile.

19. The system of claim 18 wherein the MS sends the option as part of a link control protocol negotiation.

20. The system of claim 18 wherein the state machine of the MS and the state machine of the PDSN being set in accordance with the first user profile obviates a need for any further point-to-point protocol negotiation between the MS and the PDSN.

21. The system of claim 18 wherein the negotiation of the PPP session is performed in response to an inter-packet-data-service-node handover of one of the MS and the PDSN.

22. The system of claim 18 wherein the negotiation of the PPP session is performed in response to one of the MS and the PDSN initiating a new PPP session.

23. The system of claim 18 wherein the MS and the PDSN agreement on the first user profile comprises each of the MS and the PDSN acknowledging that the first user profile is acceptable.

24. The system of claim 18 wherein, if the first user profile is not acceptable to the PDSN, the PDSN sends a second option identifying a second user profile to the MS.

25. The system of claim 24 wherein the PDSN sends the second user profile in accordance with a link control protocol negotiation.

26. The system of claim 24 wherein, if the MS and the PDSN agree on the second user profile, each of the MS and the PDSN retrieves the second user profile and the state machine of the MS and the state machine of the PDSN are set in accordance with the second user profile.

27. The system of claim 26 wherein the MS and the PDSN agreement on the second user profile comprises each of the MS and the PDSN acknowledging that the second user profile is acceptable.

* * * * *